April 27, 1954  H. T. HUNTER ET AL  2,676,552
METHOD OF FORMING RINGS OF YEASTED DOUGH
Filed June 29, 1950
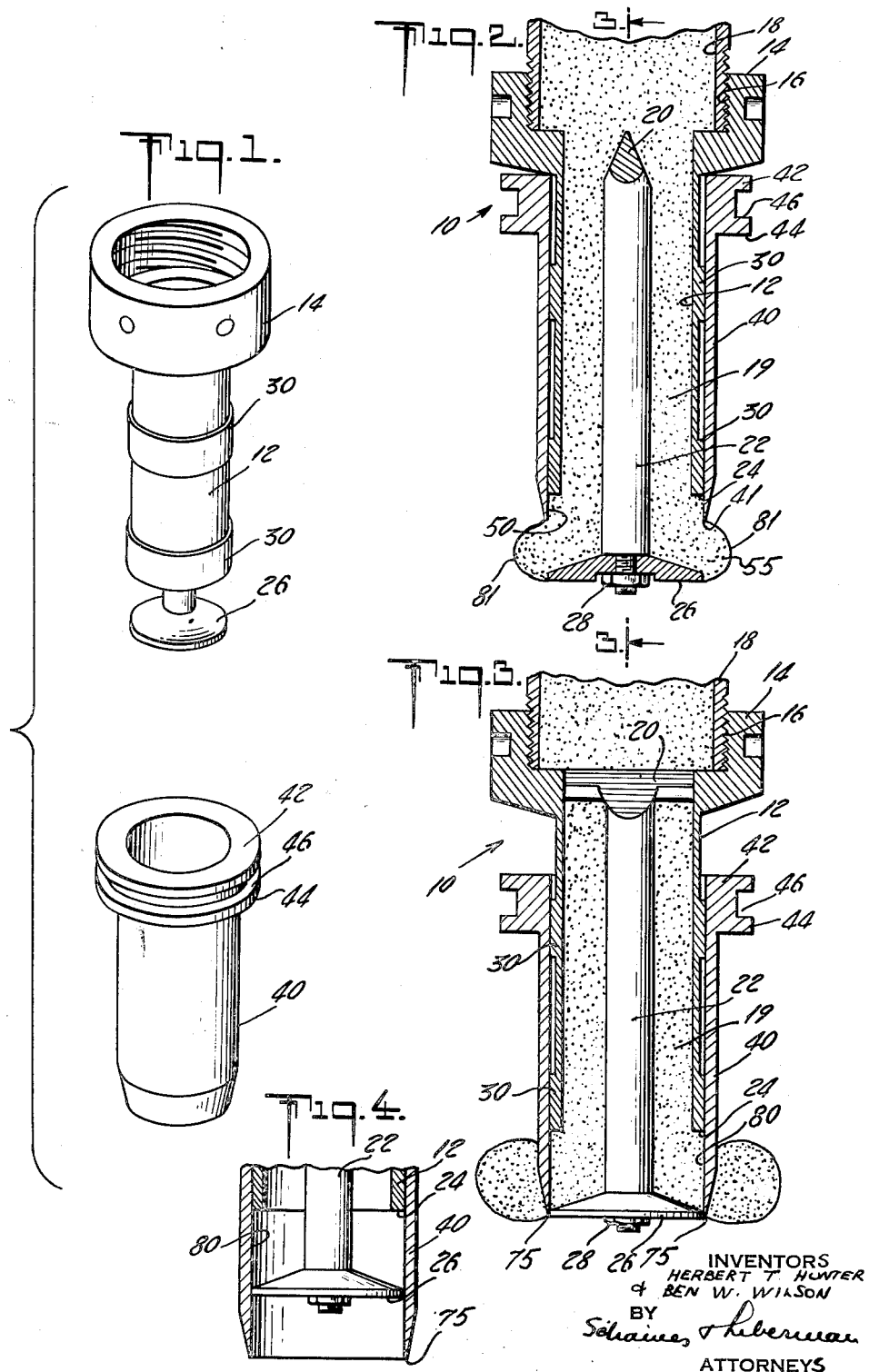
INVENTORS
HERBERT T. HUNTER
& BEN W. WILSON
BY
Schaines & Lieberman
ATTORNEYS

UNITED STATES PATENT OFFICE 2,676,552

METHOD OF FORMING RINGS OF YEASTED DOUGH

Herbert T. Hunter, Baltimore, Md., and Ben W. Wilson, Manhasset, N. Y., assignors to Doughnut Corporation of America, New York, N. Y., a corporation of New York Application June 29, 1950, Serial No. 171,076

1 Claim. (Cl. 107—54)

The present invention relates generally to devices for and methods of forming or cutting raw dough shapes. More particularly, the present invention relates to devices for and methods of cutting and forming raw dough shapes in annular forms, as doughnuts and the like. Specifically, the present invention relates to a device for and a method of forming annular shapes of yeasted dough, that is, dough in which yeast has been incorporated.

Yeast-raised dough, as is well known in the culinary arts, is lighter and fluffier (and—to some palates—tastier) than dough which does not have any yeast incorporated therein, and yeast raised doughnuts have long been sought in the trade as an extremely desirable comestible.

In the formation of yeast-raised products, it is important that the gases generated by the yeast be retained and trapped within the article, and prevented from escaping therefrom during the proofing or blooming stage. Normally, and with use of ordinary apparatus for forming annular dough shapes, the skin of the raw doughnut ring at the time of its formation is torn and disrupted. The ordinary conventional devices are thus entirely unsuitable for the handling of yeasted dough, for the yeast engendered gas or gases all too readily escape through the disrupted surface, thereby largely dissipating the benefits of the use of yeast.

The ordinary ring forming devices in the art comprise an elongated nozzle having a cutter disc spaced away from the bottom end thereof, with a cutter sleeve disposed concentrically about the nozzle and reciprocably movable back and forth across the opening between the nozzle and the disc to shear the dough forced down through the nozzle under pressure. In the conventional ring cutter, the sleeve barely passes the edge of the disc during the ring shearing operation.

The device according to the present invention is characterized in its construction by the provision of a cutting sleeve which is longer than the nozzle, whereby at least the lower portion of the sleeve extends below the nozzle and is in constant contact with the dough during the ring forming and shearing step. The present invention is also characterized by the fact that the movement of the cutter sleeve across the opening between the nozzle and the disc is substantially longer than in conventional methods, and is further characterized by the overtravel of the cutter sleeve past the disc for a substantially greater distance than that necessary to sever the formed shape from the nozzle.

An object of the present invention is the provision of a method of and apparatus for forming raw doughnut ring shapes of yeasted dough with substantially smooth imperforate skins, whereby to trap therewithin the yeast-caused gases.

Another object of the present invention is to provide in a device for forming rings of yeast raised dough a cutter sleeve which is longer than the extruding nozzle.

Still another object of the present invention is the provision in a device for forming rings of yeast-raised dough of a cutter sleeve which is longer than the extruding nozzle and in substantially constant rubbing contact with the dough during the ring forming, extruding and shearing operations.

Still another object of the present invention is the provision of a method of forming ring shapes of raw yeasted dough which includes the step of rubbing the inner aspect of the shearing sleeve against the dough mass in two directions, to thereby smooth the dough and form a skin thereabout during the shape forming operation.

Other and further objects of the invention will in part be apparent and in part pointed out specifically in the following description of an illustrative embodiment.

In the drawing annexed hereto and forming a part hereof:

Figure 1 is an exploded view of the components of one form of device constructed according to and embodying the present invention;

Figure 2 is a vertical section through the assembled device with the parts shown in position prior to the start of the forming, cutting and severing operation;

Figure 3 is a vertical section on the line 3—3 of Figure 2 with the parts shown in an intermediate position at the severing point; and Figure 4 is a fragmentary view similar to Figure 3, on the same scale, illustrating the overtravel movement of the sleeve with respect to the nozzle and disc.

The device according to the present invention is indicated generally by reference numeral 10, and includes a hollow circular nozzle 12 having a female head portion 14, internally threaded as at 16 for engagement with the outlet end 18 of a dough hopper. The mass of dough is indicated by reference numeral 19, and as is well understood, is forced from the hopper by suitable pressure into nozzle 12 toward the opening between disc 26 and the lower edge 24 of the nozzle.

A bridge bar 20 is seated within a suitable recess in nozzle 12 at the upper end thereof and fixed thereto as by brazing or otherwise. Bridge bar 20 is narrow in section in order to permit uninterrupted movement of dough past same and into and through nozzle 12. Depending centrally from bridge bar 20 is a stem 22 of such length as to extend well below the lower edge 24 of nozzle 12. A transversely extending cutter disc 26 is secured to the bottom of stem 22 as by hex-nut 28, or the like.

A plurality of peripheral shoulders, as 30, 30, are provided about nozzle 12, to serve as guides for the travel of a cutter sleeve 40 reciprocably along the length of and about nozzle 12. The upper end 42 of sleeve 40 is extended outwardly, as at 44, and provided with an annular groove or track 46. As will be understood in the art, conventional lever means (not shown) may be employed for engagement with groove 46 to reciprocably shift sleeve 40 back and forth along the length of nozzle 12 and past disc 26.

Cutter sleeve 40 is longer than nozzle 12, and when retracted to the position of Figure 2, its lower portion 50 extends well below the lower edge 24 of nozzle 12. The dough mass 20 is under constant pressure from above, moving the mass downwardly through the outlet 18 of the dough hopper, into and through nozzle 12 towards the opening between nozzle edge 24 and disc 26. It will, thus, be seen that a substantial portion of sleeve 40 is always in contact with the dough.

In operation, as the dough at 55 is extruded in annular form about disc 26, through the opening between disc 26 and the lower edge 24 of nozzle 12 and the cutting edge 41 of sleeve 40, the dough itself is thereby rubbed against the inner aspect of the sleeve extension. This rubbing action action tends, to some slight degree, to form a smooth, continuous skin about the mass. As sleeve 40 travels downwardly, the rubbing of the dough continues, and the dough trapped inside the nozzle, as at 80, see Figure 3, is contacted by the inside of the sleeve. As the cutter sleeve continues its movement below the disc, as seen in Figure 4, the dough at 80, will be rubbed downwardly by the inner surfaces of the cutter sleeve and rubbed again on the reverse travel of the cutter sleeve. This double rubbing action serves to smooth and seal that portion of the dough and form a skin thereabout. Thus, when the cutter sleeve resumes its rearmost position, as in Figure 2, and the mass of dough starts its movement outwardly under pressure past disc 26, the outer portion of the dough ring has a skin 81 formed thereon and the inner portion is thereafter rubbed during the downward movement of the sleeve so that the only disruption of the total surfaces of the raw dough shape occurs at the shear point as at 75, limiting the area of the formed shape which has been torn, and thus largely trapping the yeast-generated gases inside the formed shape. With the gases thus trapped, the ultimate article, during the subsequent treatment thereof, becomes lighter and fluffier.

The dough mass adjacent the outlet end of the nozzle is thus sleeve rubbed twice and in linearly opposite directions; once on the downward stroke of sleeve 40, between the positions of Figures 1 and 2, which rubbing is continued on through to the position of the sleeve in Figure 4. The same mass of dough is then rerubbed on the return stroke of sleeve 40 from the position of Figure 4, reversely through the position of Figure 3 and back to the position of Figure 2. When the lower edge of sleeve 40 moves upwardly past the edge of disc 26 on the return stroke, the pressure starts forcing the dough mass outwardly, and the ring shape is extruded with the dough mass smoothed at 80 forming a skin 81, which is then brought around the mass until sheared or pinched at 75, as in Figure 3, when the shearing stroke is completed. The shearing, or pinch line, while visible for a short time, ultimately becomes practically invisible during subsequent treatment of the article, and actually forms a seal or pressure closure along the line.

The attenuation of the cutter sleeve with respect to the nozzle length, and the overtravel of the disc and nozzle by the cutter sleeve result in the formation of a yeasted dough ring having a substantially smooth skin, a product different from and superior to anything machine formed by prior methods and devices. While the method and device of the present invention are well adapted for the treatment of yeasted dough, the invention is to be limited in its scope and application only by the annexed claim.

Having now described our invention, what we claim and desire to secure by Letters Patent is:

The method of forming a smooth-skinned ring shape of yeasted dough which comprises the steps of pressure-extruding a mass of dough from a source thereof initially in a straight line towards a ring-shaped orifice, thence through said ring shaped orifice in a plane at right angles to the initial line of movement of the dough, and thence shearing the extruded ring, the portion of the mass of dough adjacent the orifice being subjected to a prolonged rubbing action in one direction prior to its movement through the ring shaped orifice and thence subjected to a prolonged rubbing action in a reverse direction also prior to its extrusion whereby to smooth same prior to its extrusion through the ring shaped orifice and to draw the smoothed portion towards the line of severance from the mass.

References Cited in the file of this patent

UNITED STATES PATENTS

| Number | Name | Date |
|---|---|---|
| 2,032,420 | Kirwin | Mar. 3, 1936 |
| 2,184,825 | Wackler | Dec. 26, 1939 |
| 2,246,758 | Roth | June 24, 1941 |
| 2,600,075 | Roth | June 10, 1952 |